(12) United States Patent
Yoshida

(10) Patent No.: US 6,466,897 B1
(45) Date of Patent: *Oct. 15, 2002

(54) COMPUTER USER AIDING SYSTEM, COMPUTER USER AIDING METHOD AND STORAGE MEDIUM STORING PROGRAM THEREFOR

(75) Inventor: Hiroyuki Yoshida, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/258,344

(22) Filed: Feb. 26, 1999

(30) Foreign Application Priority Data

Feb. 26, 1998 (JP) .......................................... 10-044877

(51) Int. Cl.[7] .......................... G06F 11/30; G21C 17/00
(52) U.S. Cl. .......................... 702/186; 345/707; 706/11; 709/318
(58) Field of Search .......................... 702/186; 709/318; 713/1, 2; 345/707, 709

(56) References Cited

U.S. PATENT DOCUMENTS

| | | | | |
|---|---|---|---|---|
| 5,103,498 A | * | 4/1992 | Lanier et al. | 706/11 |
| 5,432,940 A | * | 7/1995 | Potts et al. | 709/318 |
| 5,774,118 A | | 6/1998 | Hatakama | 345/707 |

FOREIGN PATENT DOCUMENTS

| | | |
|---|---|---|
| JP | 3-95641 | 4/1991 |
| JP | 5-233323 | 9/1993 |
| JP | 7-306847 | 11/1995 |
| JP | 8-147198 | 6/1996 |
| JP | 8-166945 | 6/1996 |
| JP | 8-227265 | 9/1996 |
| JP | 9-163060 | 6/1997 |
| JP | 9-282351 | 10/1997 |
| JP | 9-305442 | 11/1997 |
| JP | 10-21037 | 1/1998 |

OTHER PUBLICATIONS

Maes, Pattie, "Agents that Reduce the Burden of Work and Information", bit , Japan Kyoritsu Publishing, Dec. 1995, vol. 27, No. 12, pp. 15–28.

Masui, Toshiyuki, "A Simple Approach to Adaptive Text Editors", Applied/Predictive Text Editing System and Software II (WISS'94) Japan Modern Science Publishing, 1994, pp. 145–154.

* cited by examiner

Primary Examiner—John S. Hilten
Assistant Examiner—John Le
(74) Attorney, Agent, or Firm—Foley & Lardner

(57) ABSTRACT

A computer user aiding system enables more effective use of a personal computer by analyzing use history of a personal computer depending upon manner of use of the personal computer in each individual user, reading tendency of use, positively transmitting functions of non-use portion of the personal computer to the user instead of Pull type but Push type. Also, the computer user aiding system permits possibility prediction suggesting possibility of occurrence of error in a use method in the case where error had been caused in the past in a similar method. The computer user aiding system includes an input unit, a storage unit storing event information caused by user in the past and personal computer functions in a form of database, a data processing unit operated under program control for obtaining all events including booting of computer, accessing of file, application, how many functions are used, analyzing tendency of use of the personal computer of the user and checking against the database stored in the storage unit, notifying manner of use for the user, and an output unit.

9 Claims, 2 Drawing Sheets

COMPUTER USER AIDING SYSTEM, COMPUTER USER AIDING METHOD AND STORAGE MEDIUM STORING PROGRAM THEREFOR

BACKGROUND OF THE INVENTION

1. Field of the Invention

The present invention relates to a computer user aiding system and a computer user aiding method for providing advice for enabling a user of a personal computer to use all functions, such as an operating system (OS), a utility, applications, drivers, basic input output system (BIOS) and so forth in a not yet used personal computer.

2. Description of the Related Art

There are various reasons why users buy personal computers. However, there are few users who can fully utilize functions of the personal computers. In most case, users merely use partial functions, such as use only for internet, use with only word-processing software or software for exchanging electronic mails (E-mails) and so forth, which can be replaced with other equipment.

For fully using functions of the personal computer, the user has to read Online Help and attached manual and so forth thoroughly to appreciate what can be done by the personal computer. However, most users cannot get over this wall to give up to use the personal computer within a range where the user can handle.

The users using the foregoing personal computer frequently use the same with little knowledge about functions held in the personal computer. For working up how to use the personal computer, the user has to learn in a personal computer school (while basic operation method of OS and applications may be learnt in the personal computer school, tools and BIOS functions uniquely supported by the computer, applied function of the applications will not be taught), to be taught by a power user, to inquire to a personal computer support center or so forth. Actually, more than half of all calls to support centers are inquiries on for how to use the computer.

On other hand, in a condition where most of the personal computer functions are not used, a marketing strategy of personal computer venders only performing sales of expensive computers which are merely improved in specifications and performances, such as speeding up of CPU, increasing of capacities of memories and/or hard disks and so forth, may not result in commercial success. Even when various functions attractive for the user to encourage the user to buy are provided in the personal computers, the user is discouraged to use the personal computer unless the functions are used satisfactorily.

On the other hand, it is possible to make the user give up use of the personal computer for difficulty of finding out the problem at the occurrence of an unknown error message.

SUMMARY OF THE INVENTION

An object of the present invention is to provide a computer user aiding system which enables more effective use of a personal computer by analyzing use history of a personal computer depending upon manner of use of the personal computer in each individual user, reading tendency of use, positively transmitting functions of non-use portion of the personal computer to the user instead of Pull type but Push type.

Another object of the present invention is to provide a computer user aiding system which permits possibility prediction suggesting possibility of occurrence of error in a use method in the case where error had been caused in the past in a similar method.

In general, the present invention obtains all events representing how a user boots a personal computer, accesses files and applications, and how many functions are used, analyzes a tendency of the user in use of the personal computer on the basis of the obtained events, checks against database of past events to provide advice for use of functions of the non-used portion of the personal computer to the user.

According to the first aspect of the present invention, a computer user aiding system comprises:

an input unit;

a storage unit storing event information caused by user in the past and personal computer functions in a form of database;

a data processing unit operated under program control for obtaining all events including booting of computer, accessing of file, application, how many functions are used, analyzing tendency of use of the personal computer of the user and checking against the database stored in the storage unit, notifying manner of use for the user; and an output unit.

According to the second aspect of the present invention, a computer user aiding system comprises:

an input unit;

a storage unit storing a user event information database storing event information caused by user in the past and a computer function database storing personal computer functions;

a data processing unit generating individual events by collecting event information representative of how user handles a personal computer in the past, obtaining other individual events simultaneously upon obtaining one individual event, establishing association between individual events for generating an associated event, analyzing the associated event with reference to past event in the user event information database for making tendency and pattern analysis per individual event for generating analyzed event, identifying functions necessary for the user with reference to the analyzed event and the computer function database; and an output unit.

Preferably, the data processing unit obtains the associated event by associating the individual event immediately before occurrence of error with other individual events for storing in the user event information database so as to be used for alerting a condition at which error is caused in the past.

According to the third aspect of the present invention, a computer user aiding method comprises the steps of:

obtaining all events including booting of computer, accessing of file, application, how many functions are used;

analyzing tendency of use of the personal computer of the user;

checking against the database stored in the storage unit; and providing advice for manner of use for the user.

According to the fifth aspect of the present invention, a computer user aiding method comprises the steps of:

collecting event information representative of how user handles a personal computer in the past;

obtaining other individual events simultaneously upon obtaining one individual event;

establishing association between individual events for generating an associated event;

analyzing the associated event with reference to past events in the user event information database for making tendency and pattern analysis per individual event for generating analyzed event;

identifying functions necessary for the user with reference to the analyzed event and the computer function database;

providing an alert to the user at every occurrence of the individual event corresponding to the identified function.

obtaining the associated event by associating the individual event immediately before occurrence of error with other individual events for storing in the user event information database, checking the individual event against the associated event stored in the user event information database for alerting a condition at which error is caused in the past.

According to the fifth aspect of the present invention, a computer readable storage medium stores a program comprising the steps of:

collecting event information representative of how user handles a personal computer in the past;

obtaining other individual event simultaneously upon obtaining one individual event;

establishing association between individual events for generating an associated event;

analyzing the associated event with reference to past event in the user event information database for making tendency and pattern analysis per individual event for generating analyzed event;

identifying functions necessary for the user with reference to the analyzed event and the computer function database;

providing an alert to the user at every occurrence of the individual event corresponding to the identified function.

The program may further comprise the steps of:

Obtaining the associated event by associating the individual event immediately before occurrence of error with other individual events for storing in the user event information database, and checking the individual event against the associated event stored in the user event information database for alerting a condition at which error is caused in the past.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious , however, to those skilled in the art that the present invention may be practiced without these specific details. In other instances, well-known structures are not shown in detail in order to avoid unnecessarily obscuring the present invention.

Figure 1:
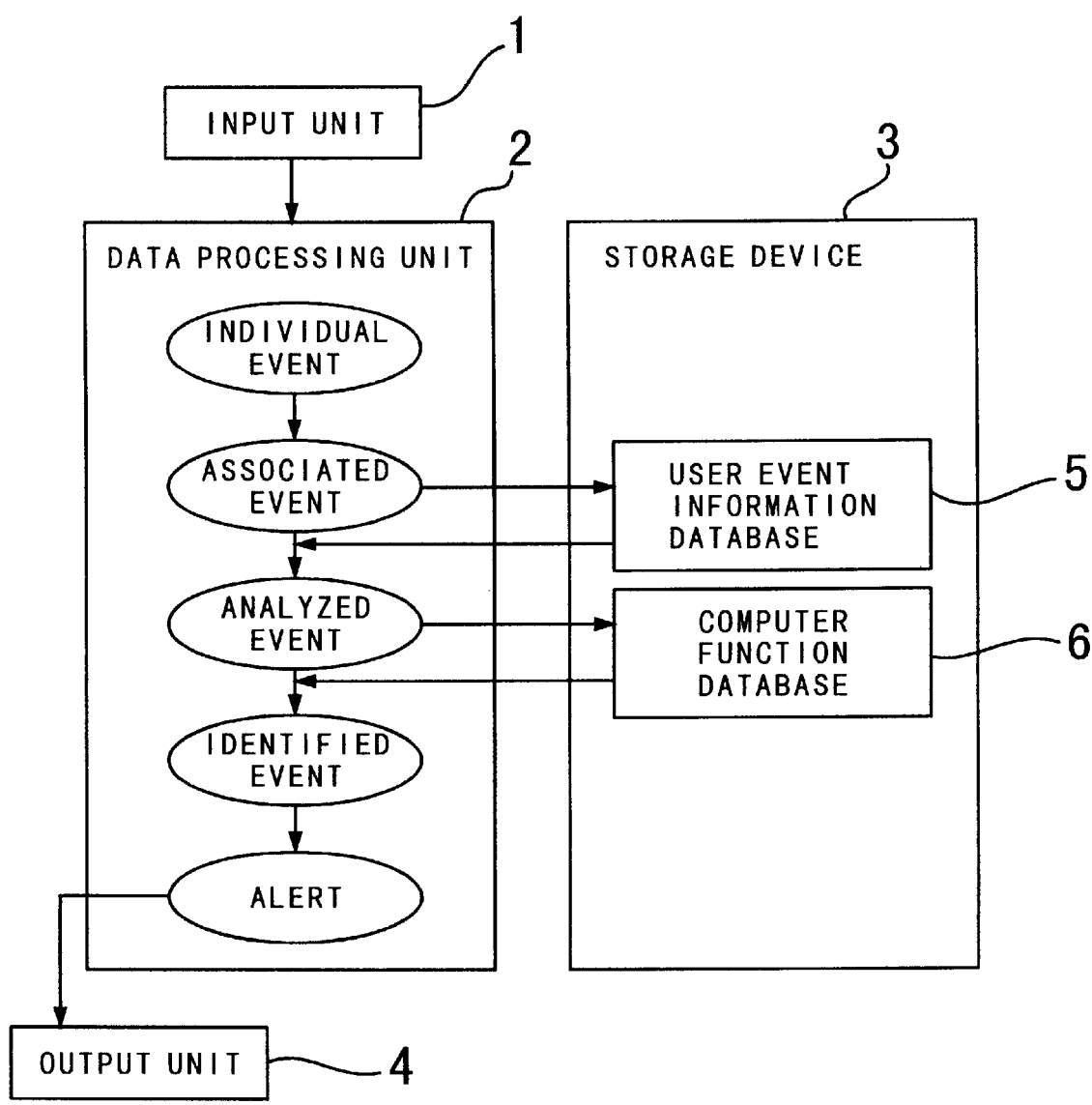
FIG. 1 is a block diagram showing one embodiment of a computer user aiding system according to the present invention.

FIG. 1 is a block diagram showing one embodiment of a computer user aiding system according to the present invention. The computer user aiding system shown in FIG. 1, is constructed with an input unit, such as a keyboard, mouse or the like, a data processing unit 2 operated under program control, a storage unit 3 storing event information and personal computer functions, and an output unit, such as a display device, a printing device or the like.

The storage unit 3 has a user event information database 5 storing event information of the event caused by the user and a computer function database 6 provided in a personal computer.

Next, discussion will be given for operation of the shown embodiment of the computer user aiding system of the invention.

At first, upon use of the personal computer by a user, each event of how the computer is booted, how files and applications are accessed, how much functions are utilized, is obtained as an individual event. An example of the individual event is as follows:

<Individual Event>
1. time instant
2. use period
3. order in sequence from ON-set of power supply
4. accessing method
5. frequency of use
6. storage position
7. condition before causing event
8. configuration of computer (CPU, memory, hard disk, BIOS, OS, driver and so forth)

As set forth above, how the user is associated with the computer, is corrected in a form of all of log/event information.

Next, upon obtaining a certain individual event, other individual events are obtained simultaneously for establishing association between individual events. The individual events for which association is established are referred to as associated events. Examples of the associated events are as follows:

<Associated Event>
1. Power ON/Power OFF
   ① time instance: Dec. 25, 1997, AM 8:25
   ② user period: AM 8:25~PM 11:00
   ③ order in sequence from ON-set of power supply: first and last
   ④ access method: boot using a power button
   ⑤ frequency of use: every time
   ⑥ storage position: no
   ⑦ condition before causing event: maintain environment of switch upon shutdown at preceding time
   ⑧ configuration of computer: identify by computer monitoring application software "DMITOOL"
2. Step Out Period
   ① time instance: AM 10:00 to 11:25
   ② user period: same as above
   ③ order in sequence from ON-set of power supply: after access file "H"
   ④ access method: no ⑤ frequency of use: three times per day
⑥ storage position: no
⑦ condition before causing event: maintain environment of switch before step out
⑧ configuration of computer:
identify by computer monitoring application software "DMITOOL"

3. Access of Designated File and Application Software
① time instance: AM 8:45
② user period: AM 8:45~9:20
③ order in sequence from ON-set of power supply: second after ON-set of power supply
④ access method: use shortcut on Desktop
⑤ frequency of use: once a day
⑥ storage position: designated holder of hard disk
⑦ condition before causing event: maintain environment of switch upon shutdown at preceding time
⑧ configuration of computer:
identify by computer monitoring application software "DMITOOL"

4. Occurrence of Error
① time instance: PM 2:15
② user period: PM 2:15~PM 2:18
③ order in sequence from ON-set of power supply: twentieth from ON-set of power supply
④ access method: after access of application "K"
⑤ frequency of use: twice a week
⑥ storage position: log file in designated holder on hard disk
⑦ condition before causing event: maintain environment of switch before occurrence of error
⑧ configuration of computer: identify by computer monitoring application software "DMITOOL"

It should be noted that the associated event is generated at every occurrence of the individual event.

Next, tendency and pattern analysis per event is performed with reference to the associated event and past user event information database. The event analyzed is referred to as analyzed event. The analyzed event represents habit of the user which is practice of use of the computer and current use range of the personal computer of the user. An example of analyzed event is as follows:

<Analyzed Event>
1. User starts up computer at 8:30 on weekday.
2. User starts up E-Mail software immediately after booting computer.
3. User starts up a game software at 12:00.
4. Stalling of computer is frequently caused after user uses an application "K".
5. Black out is caused in the computer when user accesses file "M".
6. User rarely use application "Z".
7. User steps out from AM 10:00 to AM 11:30 on every Wednesday, and after stepping out, E-Mail software is used at first.

Next, the analyzed event is discriminated for identifying functions necessary for the user with reference to the personal computer function database of the specification and functions provided in the computer. Such event is referred to as identified event. An example of the identified event is as follows:

<Identified Event>
1. User Boots the Computer at 8:30 on Weekday
An alert is automatically given to the user asking whether computer is to be booted at 8:30 on weekday.

2. User Starts up E-Mail Software Immediately After Booting Computer
→An alert is given to the user whether E-Mail software is to be registered in start-up so that E-Mail software can be used immediately after booting.

3. User Starts up a Game Software at 12:00.
→An alert is given whether the game software is to be automatically started up at 12:00.

4. Stalling of Computer is Frequently Caused After User Uses an Application "K".
→An alert is given that the computer can stall upon use of application "K".

5. Black out is Caused in the Computer when user Accesses File "M".
→An alert is given that error has caused at preceding time under the same environment before accessing file "M".

6. User Rarely use Application "Z".
→An alert is given whether the application "Z" is to be stored in a removable medium in compressed form.

7. User Steps out From AM 10:00 to AM 11:30 on every Wednesday, and After Stepping out, E-Mail Software is Used at First.

As set forth above, notifying alert is given for the user at every occurrence of the identified event. By setting up the personal computer according to alert given set forth above, the user may be enabled to use optimal functions provided in the personal computer as needed.

Figure 2:
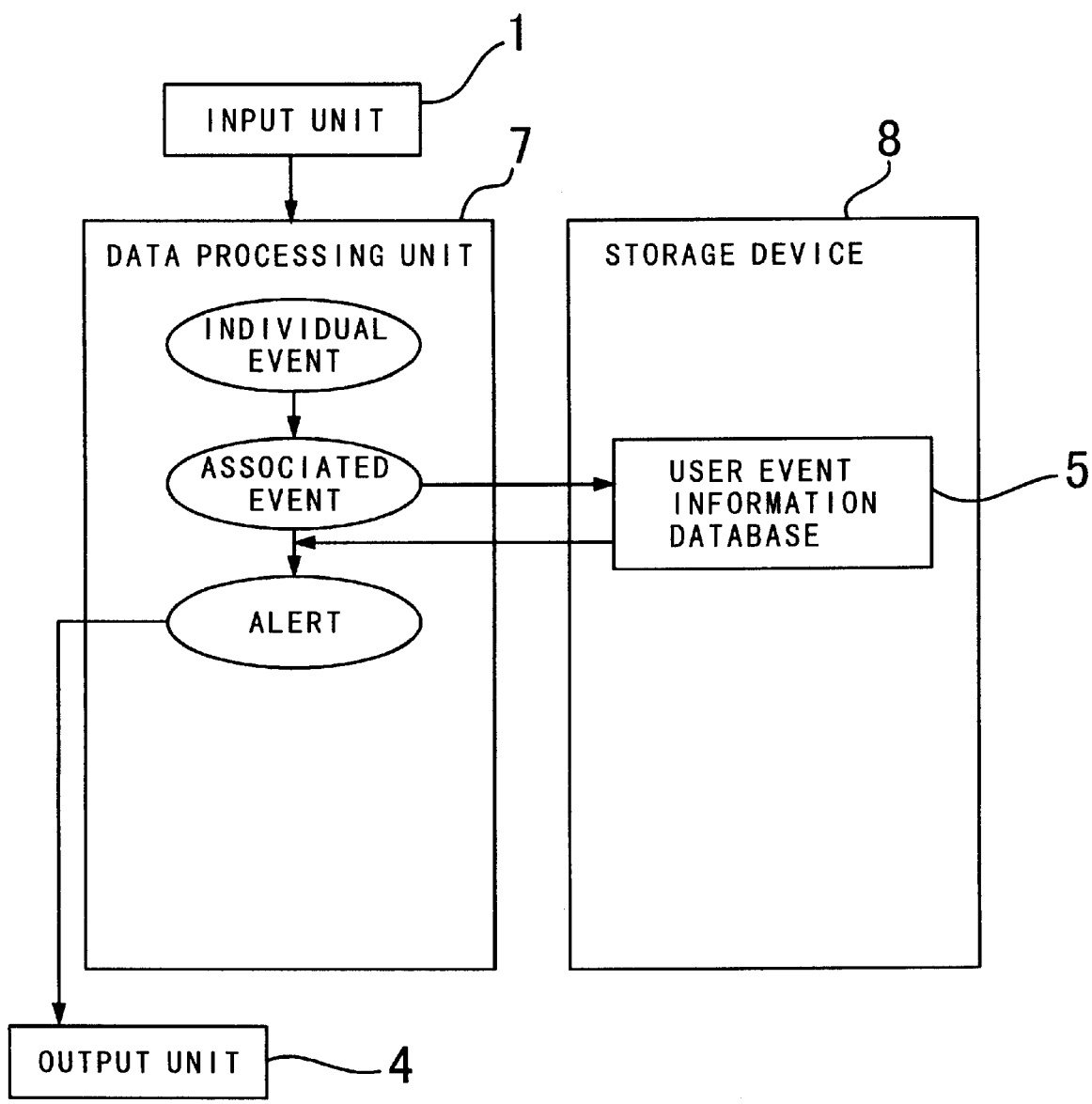
FIG. 2 is a block diagram showing another embodiment of a computer user aiding system according to the present invention.

FIG. 2 is a block diagram showing another embodiment of the computer user aiding system according to the present invention. The computer user aiding system shown in FIG. 2 includes the input unit 1, such as the keyboard, mouse and so forth, a data processing unit 7 operated under program control, a storage unit 8 having the user event information database 5 storing event information of the event caused by the user, and the output unit 4, such as a display device, a printing device and so forth.

Referring to FIG. 2, when stalling of the computer is caused due to unknown error, the associated event is obtained by associating the individual event immediately before occurrence of error with other individual event. The associated event thus obtained is checked against the user event information database to notify to the user as a notifying alert indicative of precedingly occurring error. By this, possibility of occurrence of error can be predicted.

As set forth above, according to the present invention, unknown portion of functions of the personal computer is positively notified to the user to permit effective use of the personal computer. Thus, utilization factor of the personal computer by the user can be increased. As a result, degree of satisfaction of the user can be improved to assure obtaining of repeated user.

On the other hand, inquiry for use method of the computer to the personal computer support center can be decreased to reduce support cost of the personal computer.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A computer user aiding system comprising:
   an input unit;
   a storage unit storing, in a form of a database, event information caused by a user in the past and functions of a personal computer;
   a data processing unit operated under program control for:
   a) obtaining current events including:
      i) booting of the personal computer, and
      ii) accessing of a file, an application, and how many functions are used;
   b) analyzing a tendency of use of the personal computer of the user;
   c) checking said current events against the database stored in said storage unit, and
   d) notifying the user of at least one of (1) functions of the personal computer not previously used by said user and (2) a condition which caused a past error; and
   an output unit for providing the notification.

2. A computer user aiding system comprising:
   an input unit;
   a storage unit storing a user event information database storing event information of past events caused by a user operating a personal computer and a computer function database storing functions of the personal computer;
   a data processing unit for:
   a) generating individual events by collecting event information representative of how the user has utilized the personal computer in the past;
   b) obtaining other individual events which are caused by said individual events;
   c) establishing an association between individual events and the other individual events for generating associated events;
   d) analyzing said associated events with reference to past events in said user event information database for making a pattern analysis of individual events for generating analyzed events; and
   e) identifying functions necessary for the user with reference to said analyzed events and said computer function database; and
   an output unit for providing notification to the user of said identified functions.

3. A computer user aiding system as set forth in claim 2, wherein said data processing unit obtains said associated event by associating the individual events immediately before an occurrence of an error with other individual events for storing in said user event information database so as to be used for alerting a condition which has caused said error in the past.

4. A computer user aiding method comprising the steps of:
   a) obtaining current events including:
      i) booting of a personal computer, and
      ii) accessing of a file, an application, and how many functions are used;
   b) analyzing a tendency of use of the personal computer of the user;
   c) checking said current events against the database stored in said storage unit; and
   d) providing the user with advice regarding at least one of (1) the functions of the personal computer not previously used by said user and (2) a condition which caused a past error.

5. A computer user aiding method comprising the steps of:
   a) collecting event information representative of how the user has utilized a personal computer in the past;
   b) obtaining other individual events which are caused by said individual events;
   c) establishing an association between individual events and other individual events for generating associated events;
   d) analyzing said associated events with reference to past events for making a pattern analysis of individual events for generating analyzed events;
   e) identifying functions necessary for the user with reference to said analyzed events; and
   f) providing an alert to the user at every occurrence of the individual event corresponding to said identified functions.

6. A computer user aiding method as set forth in claim 5, which further comprises the steps of:
   obtaining said associated events by associating the individual events immediately before an occurrence of an error other individual events indicating said error for storing in a user event information database; and
   checking the individual events against the associated events stored in said user event information database for alerting the user to a condition which has caused said error in the past.

7. A computer readable storage medium storing a program which, when executed on a computer, causes said computer to perform the steps of:
   a) collecting event information representative of how a user has utilized the computer in the past;
   b) obtaining other individual events which are caused by said individual events;
   c) establishing an association between individual events and other individual events for generating associated events;
   d) analyzing said associated events with reference to past events for making a pattern analysis of individual events for generating analyzed events;
   e) identifying functions necessary for the user with reference to said analyzed events; and
   f) providing an alert to the user at every occurrence of the individual event corresponding to said identified functions.

8. A computer readable storage medium as set forth in claim 7, wherein said program further causes said computer to perform the steps of:
   obtaining said associated events by associating the individual event immediately before an occurrence of an error other individual events indicating an error for storing in a user event information database; and
   checking the individual events against the associated event stored in said user event information database for alerting the user to a condition which has caused said error in the past.

9. A system for aiding a user during use of a computer comprising:
   an input unit for inputting user event information;
   a storage unit for storing the user event information input by the user using the input unit and for storing corresponding computer event information generated by the computer;
   a data processing unit for analyzing user tendencies and patterns based on the user event information and the computer event information stored in the storage unit; and
   an output unit for alerting the user of optimal computer functionality based on an analysis performed by the data processing unit.

* * * * *